United States Patent [19]

Schaaf

[11] 4,149,318
[45] Apr. 17, 1979

[54] APPARATUS FOR MEASURING THE SQUARE FOOTAGE OUTPUT OF DIAZO PRINTING MACHINES AND THE LIKE

[76] Inventor: Thomas G. Schaaf, 11715 Rockwall St., Lakewood, Calif. 90715

[21] Appl. No.: 770,882

[22] Filed: Feb. 22, 1977

[51] Int. Cl.² ............................................. G01B 5/26
[52] U.S. Cl. ...................................... 33/124; 33/129; 33/141.5
[58] Field of Search ...................... 33/123, 124, 141.5, 33/134 R, 142, 125, 129; 354/299

[56] References Cited
U.S. PATENT DOCUMENTS

| | | | |
|---|---|---|---|
| 2,761,986 | 9/1956 | Wald et al. | 33/134 R |
| 2,949,839 | 8/1960 | Aronson et al. | 354/299 |
| 2,972,813 | 2/1961 | Stinton | 33/142 |
| 3,732,625 | 5/1973 | Vernooy | 33/141.5 |

*Primary Examiner*—William D. Martin, Jr.
*Attorney, Agent, or Firm*—Richard S. Sciascia; Paul N. Critchlow

[57] ABSTRACT

Most Diazo printers and other such copy machines have an automatic feed capability provided by a drive roller for receiving light-sensitive paper from copy paper rolls of varying widths and feeding the paper into the machine. To provide a square footage count of the machine output, a measuring wheel is mounted to ride on the drive roller and be driven by its contact with the copy paper. The wheel roller which carries a small magnet is disposed closely adjacent to a magnetic switch so that, once during each roller revolution, the magnet closes the switch and closes a power circuit coupled to a counter. The diameter or circumference of the wheel roller is preselected so that each of its revolutions represents one square foot of the copy paper on which it rides. Preferably, there are provided a plurality of wheel rollers each of which has a diameter matching that of various copy paper widths for which the machine is adapted.

6 Claims, 2 Drawing Figures

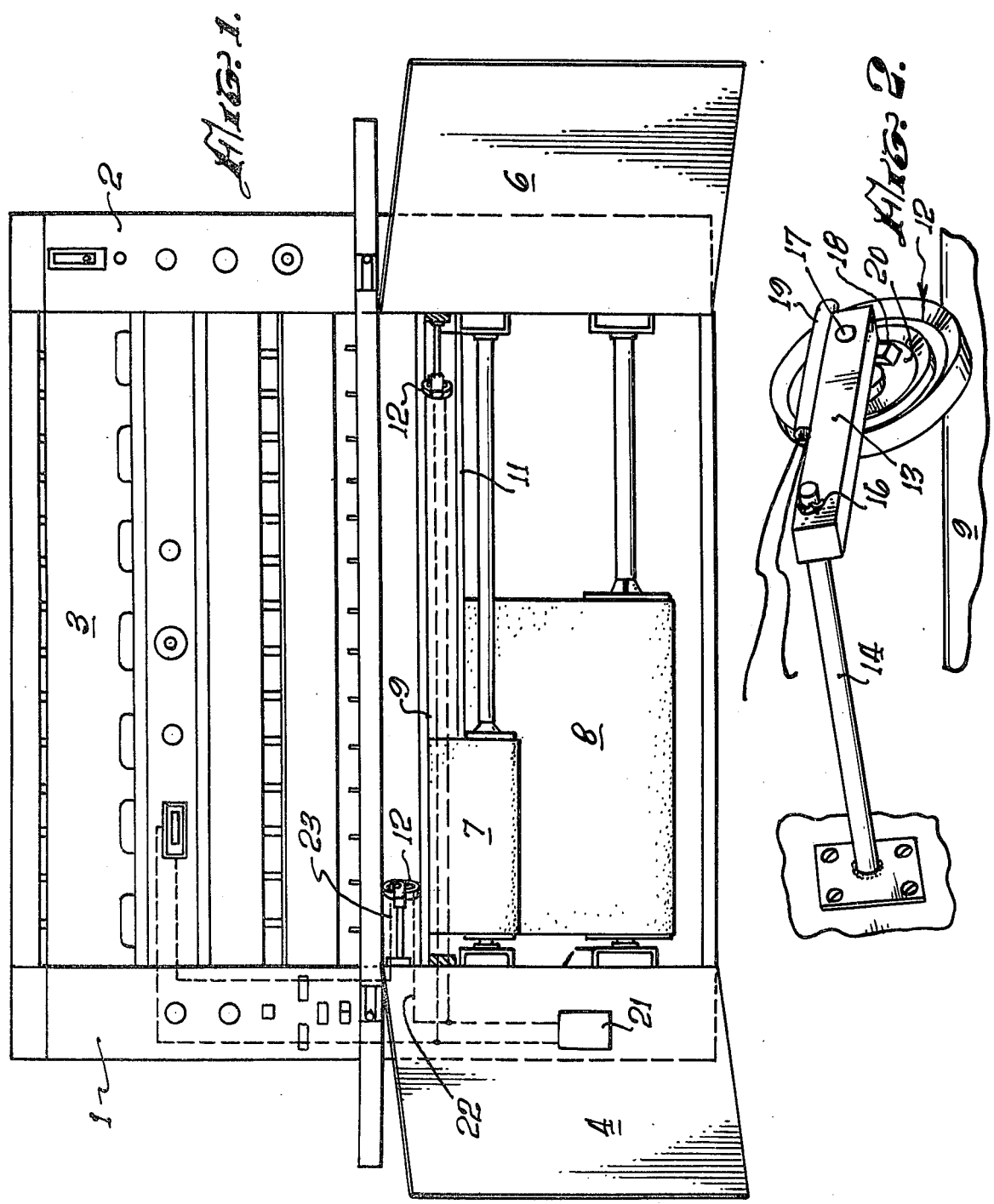

APPARATUS FOR MEASURING THE SQUARE FOOTAGE OUTPUT OF DIAZO PRINTING MACHINES AND THE LIKE

BACKGROUND OF THE INVENTION

The invention described herein may be manufactured and used by or for the Government of the United States of America for governmental purposes without the payment of any royalties thereon or therefor.

The invention relates to commercial automatic copy machines and, in particular, to means for measuring the printed output of such machines.

The present description will be with reference to commercial diazo printing machines which customarily include a drive roller to feed copy paper received from machine-supported rolls into the reproduction or processing section of the machine. However, it will be apparent that the principles and mechanisms to be described readily can be adapted for advantageous use by other comparable machines such as those used to feed to various types of strip-like material of varying widths into a processor. Many of these machines, such as the diazo printers, are of a type in which the paper or other material is fed automatically until a predetermined output footage has been processed at which point the machine automatically cuts off to terminate operation. An electric eye device usually is used to provide the cut-off.

One of the problems involved in the use of the diazo printers has been in the area of providing a precise count or determination of the machine output. Precision is needed to permit the printer to charge customers accurately for the reproduction service. This problem is of particular concern to large scale printing operations in which a number of these machines may be in almost constant use with their outputs cumulatively involving extremely copious amounts of the printed product to be billed. Obviously, in such large scale productions, it is very time-consuming and expensive to require an operator to physically measure the dimensions of each customer's order. However, in many conventional practices, for lack of a more efficient method, such physical measurements have been the custom. Other techniques also have been attempted such as the use of weighing scales to determine the precise ounces or pounds of the production with the weight determination then being converted to footage data by means of comprehensive conversion charts. Such a technique also is inefficient and, further, because of the varying types of inputs the scale does not consistently perform in an accurate manner. As is known, the inputs to these machines have many different variables and they are of many different sizes. It is because of these many variables that there has been a difficulty or, at least, a serious inefficiency, in determining accurately the output measurements. For example, in diazo printers, customers order many different widths according to their own desires. A running foot measurement of the output does not automatically provide an accurate count for billing purposes.

As will be described, the present invention has as its principal object the provision of an automatic square foot measurement of the machine output although an equally important object is to achieve this result in an unusually simple, inexpensive and reliable mechanism manner and by a mechanism that readily can be attached to or mounted on presently-used commercial machines.

With regard to these objects it is noted that there are a number of prior art references which have a capability of providing square footage output measurements. For the most part, however, this art is concerned with highly-specialized operations such as the measurements of planning or machining mills and, perhaps of greater significance, it utilizes rather complex or intricate mechanisms which themselves would involve relatively expensive modifications to existing printers and also would involve serious problems in any attempt to adapt them for use in such printers.

The nature of the present invention has been generally indicated in the foregoing Abstract of the Disclosure as including essentially a magentic switch coupled with a normally-open circuit which includes a square footage counter. A wheel roller is mounted to ride on the copy paper as it is fed into the machine by a drive roller and the wheel roller mounts a magnet that closes the counter circuit by closing the switch once during each revolution of the wheel roller. By using a wheel roller of such a diameter or circumference that each of its revolutions represents one square foot of the traveling copy paper, a square footage measurement is provided by the counter.

DETAILED DESCRIPTION OF THE DRAWINGS.

The present invention is illustrated in the accompanying drawings of which:

FIG. 1 schematically illustrates a commercial diazo printer on which the square-footage counter apparatus is mounted, and FIG. 2 is a perspective showing the measuring apparatus.

DETAILED DESCRIPTION OF THE INVENTION

Referring to FIG. 1, the printer, as is known, is a relatively large machine mounted in a metal cabinet formed in part by standards 1 and 2, a front panel 3 and panel doors 4 and 6 which open to permit loading of the machine with copy paper rolls 7 and 8. As shown, the rolls are of different widths and each roll is mounted on a separate drive shaft 9 and 11 journaled in the cabinet structure and electrically driven by motors not shown in the drawing. The paper of each roll feeds over its drive shaft into the processing section of the machine which, as will be understood, photographically reproduces the copy paper which itself is light sensitive. The paper is fed or driven by the drive rolls and, in many machines, it's feed continues until it is automatically cut-off.

It further will be noted that the drive rollers extend the width of the machine so that they can accomodate copy paper rolls of various widths. Two such widths are shown in FIG. 1 but it will be recognized that many other widths conventionally are mandated by the customer's orders. For example, copy paper widths used for these purposes may include such dimensional variations as 15", 18", 22", 24", 30" and 40". The problem, as has been indicated, is one of accurately and automatically determining the square footage output of the machine for the many widths of the copy paper for which the machine is adapted. By way of illustration, it frequently is the practice first to run an order requiring one width, such as the width of roll 7, and immediately, upon completion of that order, to run an order requiring the roll 8 width. The machine then must accurately provide a measurement of the output for each order and, clearly, a running foot measurement does not suffice. It might, however, be noted that machines of this type are not concerned about fractions of a foot or square foot since it is the practice to bill for the amount counted with any fraction on one or the other side being considered negligible.

The measurement apparatus of the invention primarily includes a measuring wheel roller 12 riding on each of the drive rollers 9 and 11. Since these wheel rollers are identical, a description of one should suffice for both. As best seen in FIG. 2, wheel roller 12 is rotatably mounted on a bracket arm 13 which itself is pivotally carried by a bracket 14 sucured to the cabinet structure. The arrangement is disposed to permit the wheel roller to ride on drive roller 9 or 11 although, when the copy paper is being fed by the drive roller, the wheel actually rides on the paper and is driven by it. For this purpose, the rotational axes of the wheel rollers and the drive rollers preferably are aligned. Bracket 14, as shown, is simply a rod extending loosely through arm 13 and secured by a cotter pin 16 or the like. One advantage of this coupling is that the bracket arm with its wheel roller easily can be removed or detached to permit a substitution of a wheel roller of a different diameter. Preferably, however, the wheel roller itself is detachably mounted on its pin 17.

The features of the invention are more directly concerned with the magnetic means for counting each complete revolution of wheel roller 12 as well as the sizing of the wheel roller itself to provide a reliable square footage count. For these purposes, wheel roller 12 physically mounts a small permanently-polarized magnet 18 which, as shown, is carried in a radially-spaced disposition from its rotational axis. Also, bracket arm 13 carries a magnetic switch mechanism 19 in a position in which, during each wheel roller revolution, magnet 18 is brought into close proximity with the switch. To permit the desired close proximity and therefore minimize the size and strength requirements of magnet 18, wheel roller 12 is formed with an axially extending flange 20 and the magnet is mounted on this flange. As shown, flange 20 is in close proximity to the rotational axis of the wheel roller and thus in close proximity to magnetic switch 19.

As will readily be understood, switch 19 can be implemented in a number of manners and, in fact, a number of suitable switches are readily available. In principle, the switch may include a permanently-polarized switch arm magnetically attracted to or repelled from magnet 18 when the magnet is rotated into its dead center position. The switch arm, in turn, closes an electric circuit shown in FIG. 1 as including a power source 21, a conductor 22 supplying power to the normally open magnetic switch and another conductor 23 coupled through a counter 24 back to the power source. Thus, each time the magnetic switch is closed by magnet 18, a electrical impulse activates the counter which, obviously, then provides a count of the revolutions of wheel roller 12.

To provide the desired square footage count, wheel roller 12 is precisely machined to specifications based upon the width of the copy paper rolls being fed into the machine. By way of illustration, the following is a listing of conventional roll widths converted to wheel roller circumferences which provide a count of one square foot for each of their revolutions:

40"width roll,144"÷40"=3.6"circum.
wheel,3.6"×40"=144"(1 sq.ft.)
30"width roll,144"÷30"=4.8"circum.
wheel,4.8"×30"=144"(1 sq.ft.)
24"width roll,144"÷24"=6.0"circum.
wheel,6.0"×24"=144"(1 sq.ft.)
22"width roll,144"÷22"=6.55"circum.
wheel,6.55"×22"=144"(1 sq.ft.)
18"width roll,144"÷18"=8.0"circum.
wheel,8.0"×18"=144"(1 sq.ft.)
15"width roll,144"÷15"=9.6"circum.
wheel,9.6"×15"=144"(1 sq.ft.)

As indicated by the above listing, the present apparatus, in addition to its simple magnetic mechanism, includes a series of wheel rollers 12' 12" (FIG. 3) various diameters or circumferences so that, as the width of the copy paper roll is changed, a different and appropriately sized wheel roller readily can be installed. One of the distinct advantages of the apparatus is its simplicity and ready adaptability for use with present commercial printing machines such as the diazo printers used for mass production purposes. Thus, the apparatus itself is an unusually inexpensive device requiring only the use of appropriate bracket supports, a magnetic switch, a magnet and the wheel rollers. As such, it nevertheless eliminates a perplexing and costly inefficiency in obtaining a reliable count or measurement of the output on which an accurate billing of the customer can be based. In fact, the arrangement is of such simplicity that it can be installed on existing machines, such as the GAF printers, in a matter of several hours at the most and its parts are readily available or easily fabricated items. For example, the electrical requirements are fulfilled by a 110 volt power circuit already in the machine. In the installation the counter should be installed in the upper front of panel 3 for easy access by the operator and, preferably, it should be a retractable counter so that the operator can reset it for each job.

Obviously many modifications and variations of the present invention are possible in the light of the above teachings. It is therefore to be understood that within the scope of the appended claims the invention may be practiced otherwise than as specifically described.

I claim:

1. Apparatus for use in measuring the square footage output of a light-sensitive copy machine of a type having a rotatably-driven drive roller for feeding copy paper rolls of varying widths into the machine, the apparatus comprising:

a measuring wheel roller of a preselected diameter rotatably carried by said machine in position to contact said drive roller whereby paper fed into the machine by said drive roller is capable of rotatably driving said wheel roller, a magnetic switch means having a permanently-polarized magnetic switch arm disposed in close proximity to said wheel roller at a radially-spaced distance from its rotatable axis, electrically-energized circuit means coupled to said switch means, a permanently-polarized magnet mounted on said wheel roller at a radially-spaced disposition from its rotatable axis, said magnet being sufficiently small to occupy a limited arcuate portion of said wheel roller circumference whereby, during each rotation of said wheel roller said magnet is moved into close proximity with said magnetic switch arm, said magnet being of sufficient strength and appropriate polarity for magnetically activating said switch means when in said close proximity and for deactivating the switch means during other rotary dispositions whereby said switch is activated once during each revolution of said wheel roller for providing a count of said revolutions, and means coupled into said circuit for counting said revolutions;

said preselected diameter of said wheel being determined by the width of each copy paper roll fed into the machine, the relationship of said diameter to the width of the roll being such that each revolution of said wheel roller represents one square foot of the copy paper being fed into the machine.

2. The apparatus of claim 1 wherein said switch means is normally-open and is closed by said activation for electrically energizing said counter.

3. The apparatus of claim 1 wherein said wheel roller is detachably mounted for replacement by another roller of a different preselected diameter.

4. The apparatus of claim 3 further including:

a bracket carried by said copy machine, and a bracket arm pivotally mounted on said bracket and extending transversely of said drive roller of said machine, said wheel roller being rotatably carried by said bracket arm with its rotational axis aligned with that of the drive roller.

5. The apparatus of claim 4 wherein said magnetic switch means is mounted on said bracket arm in close proximity to the rotational axis of said wheel roller.

6. The apparatus of claim 5 further including:

a plurality of wheel rollers of varying diameters, each diameter being determined by the varying widths of the copy paper rolls for which the machine is adapted.

* * * * *